May 16, 1967 M. H. PEPKE 3,320,018
OPTICAL SYSTEM FOR PHOTOGRAPHING OBJECTS AT
LEAST IN PART IN A LIQUID MEDIUM
Filed April 29, 1963 7 Sheets-Sheet 1

INVENTOR
MAX H. PEPKE
BY Sidney A. Ochs
ATTORNEY

INVENTOR.
MAX H. PEPKE
BY
Sidney A. Ochs
ATTORNEY

May 16, 1967 M. H. PEPKE 3,320,018

OPTICAL SYSTEM FOR PHOTOGRAPHING OBJECTS AT LEAST IN PART IN A LIQUID MEDIUM

Filed April 29, 1963 7 Sheets-Sheet 3

INVENTOR
MAX H. PEPKE
BY Sidney A. Ochs
ATTORNEY

INVENTOR
MAX H. PEPKE
BY Sidney A. Ochs
ATTORNEY

INVENTOR
MAX H. PEPKE
BY Sidney A. Ochs
ATTORNEY

INVENTOR
MAX H. PEPKE
BY Sidney A. Ochs
ATTORNEY

INVENTOR
MAX H. PEPKE
BY Sidney A. Ochs
ATTORNEY

United States Patent Office 3,320,018

Patented May 16, 1967

3,320,018

OPTICAL SYSTEM FOR PHOTOGRAPHING OBJECTS AT LEAST IN PART IN A LIQUID MEDIUM

Max H. Pepke, 309 W. 19th St., New York, N.Y. 10011

Filed Apr. 29, 1963, Ser. No. 276,336
5 Claims. (Cl. 350—223)

This invention relates to lens systems and camera mechanisms for use in observing or photographing objects or electromagnetic radiations, visible or otherwise, in or through one or any number of transmitting media each of which may possess any characteristic which could cause deflection of the light rays or of the radiations. It is especially concerned with providing lens systems and camera means including controls for use in observing, photographing, or telecasting of objects in a fluid medium. It is also directed to overcoming problems presently encountered in underwater photography wherein a camera enclosed in a watertight housing is used to observe submerged objects through a window or port, of flat glass or plastic or through a lens having an outer flat surface exposed to the water. Examples of the latter are to be found in the patents to Jackman 2,001,683 and Ivanoff et al. 2,730,014.

A flat port or window as used in underwater photography has a number of disadvantages. Its use reduces the field of view of the camera and requires a greater camera to object distance to photograph an object of given size. With increased distances suspended particles in the water may obscure the object and the photographs may register blue-green because of the selective absorption of light by the water. In addition a flat port causes submerged objects to appear to be magnified and closer to the camera and the full field of view of the camera is never realized. Also magnification is not constant over the entire field and the non-linear increase of refraction away from the camera axis throws the edges and corners of the image out of focus and causes objects at the edges and corners of the picture to be distorted and appear smeared when the camera lens is adjusted for critical focus at the center of the picture. Moreover, with the use of a flat port the conventional lens-barrel markings which give focus distances are not valid and new calibration or special compensation is needed to make the correct distance setting for critical focus. Furthermore, if the water in which the mechanism is to function is sea water the problems are of greater urgency than where fresh water is the operational fluid.

Both Jackman and Ivanoff attempt to overcome some of these problems after they have occurred by interposing optical surfaces and lenses between the camera lens and window face in contact with the water to correct or partially correct the distortions attributable to the flat outer surface of the window or port. The present invention is among other things concerned with avoiding these problems, not correcting them after occurrence. Moreover, the foregoing patentees describe relatively complex systems which they correct or partially correct for underwater use only. Neither system of these patentees is suitable for use in air or other fluid media. Both are subject to variations of the index of refraction of the media in which they are immersed. Differences will therefore be noted even between fresh and salt water. I am also aware that in the patent to Gruen 1,122,104 there is shown what appears to be a flat member with a dished central portion and which is generally described as ag lass or lens covering an aperture. It would appear that only a transparent cover plate was intended and that any shaping was not intended for optical reasons but rather to resist hydrostatic pressure.

The present invention makes possible a mechanism suitable for immersion in any fluid media including air and which may be used to observe or photograph all parts of an object without distortion or shift even though the object may be partly or wholly submerged in a fluid of any character.

Broadly stated the foregoing problems are overcome by using as the means of separation between the transmitting media a spherical port comprising a glass or lens having curved inner and outer surfaces whose centers of curvature except for extraordinary cases where focus shift is a problem are substantially coincident and which coincident centers are located at a point which I term the apparent optical center of the camera lens or lens system which point is coincident with the point of intersection on the principal axis of the lens or lens system of the projected paths of the chief rays from the object points to the entering element of the lens or lens system. This point is commonly known as the center of the entrance pupil. The chief rays act as axes of symmetry for the bundles, pencils or cones of rays they represent and so define their direction as they enter and then traverse the optical system. The bundles, pencils and cones of rays each have reference to a group of light rays entering the optical system from a single object point. The central ray of each of these bundles, pencils or cones is the chief ray. Every point between the port and entering element of the lens system in the said projected path of a chief ray will when traced through the optical system fall on a common point in the focal or film plane.

In the case of a single element lens for example such as a meniscus or simple convex lens the aforesaid apparent optical center is at the entrance pupil of the lens itself or that part which is effective. Stated otherwise it is at the geometric center of the lens. For other lens systems the apparent optical center or point of intersection described above may be readily determined in practice by actually tracing rays, by using the manufacturers' trace drawings for the lens system or by the grid test method hereinafter described whereby the lens to port distance for any selected port curvature is adjusted until the grid size is equal above and below water. Once this is established the center of curvature of the port is also known and any radius of curvature for the port may be employed so long as the same center of curvature is used. With an arrangement such as described the system, as will hereinafter be shown, will be independent of the refractive indices of the transmitting media. The field of view of the camera will suffer no reduction and defocussing and aberration at the picture edges and corners is substantially if not completely eliminated.

The basis for this construction is the correlation of three factors or observation. First, it has been noted that the chief rays entering a lens appear to be travelling along the radii of a hypothetical sphere whose center is located at the geometric center of the lens. Secondly, it is a principle of refraction of light that a light ray, passing from one optical medium to another is not refracted if it penetrates the boundary normal to the plane of separation at the point of penetration, a principle which is independent of the refractive indices of the media. Thirdly it is a principle of solid geometry that given a plane tangent to the surface of a sphere, with a radius of the sphere drawn to the point of tangency, the radius is perpendicular to the tangent plane, i.e. every radius of a sphere penetrates the sphere normal to the surface at the immediate point of penetration. Taken together these principles provide the basis for my invention.

In the optimum arrangement utilizing these principles all chief rays from all object points travel along radii of the spherical surfaces which separate the media. All chief rays penetrate the boundary perpendicularly so they are not refracted. Since no refraction occurs the system is independent of the refractive indices of the transmitting media. With the centers of curvature of both surfaces of the spherical port coincident, the port material may be any thickness, and may have any refractive index without causing refraction. The field of view of the camera will suffer no reduction. Moreover, it is the same in water as in air. Lastly, the problem of defocussing and aberration at the picture edges and corners is completely eliminated.

The principal object of the invention is therefore to provide a lens system for observing or photographing objects located in one or more light transmitting medium of predetermined refractive indices from a light transmitting media of the same or a different refractive index without undesirable distortion or focus shift.

Another object is to provide a port or window through which to observe without distortion or blur an object positioned in media one or more of which is different from that from which the observation is being made, said port having oppositely curved faces of predetermined curvature determined by the lens, human or artificial, through which the observation is made.

A further object is to provide a fluid type camera enclosure through which to observe or photograph objects submerged in a fluid medium such as water (as distinguished from the media of the enclosure) which enclosure includes a window or port so constructed as to permit observation of or photographing of the object without reduction in the field of view over that possible if the object and camera containing media were alike.

A specific object is to provide a lens or window as in the preceding objects which is of convex character and which has opposite curved surfaces of substantially concentric spheres.

Still another object is to provide an enclosure as in the preceding object in which the window or port is constituted of a convex lens having opposite curved surfaces whose centers of curvature are substantially coincident and which center of curvature is located at substantially the apparent optical center of the camera lens as determined by the intersection of the chief rays of a plurality of bundles of rays of light from points of the object under observation.

A specific object is to provide a structure as in the preceding object wherein the camera lens is a meniscus or simple convex lens and wherein the center of curvature of the port is at the geometric center of the lens.

It is also an object of the invention to provide an enclosure as in the preceding objects suitably mounting a motion picture, television, or still camera and which enclosure embodies essential controls externally operable for effecting one or more camera positions, *f* stops, focus, film movement, and shutter control while the enclosure is submerged in a fluid.

Still another object is to provide an underwater camera structure provided with a visual optical system facilitating underwater viewing while wearing glasses.

Another specific object is to provide the spherical port or window construction of the preceding objects in diving masks or goggles.

Other objects and advantages of the invention will appear from the following consideration of certain fundamental theoretical aspects of the invention, the description of illustrative embodiments of the invention and the accompanying drawings in which similar characters of reference denote corresponding parts in the several views.

Figure 1:
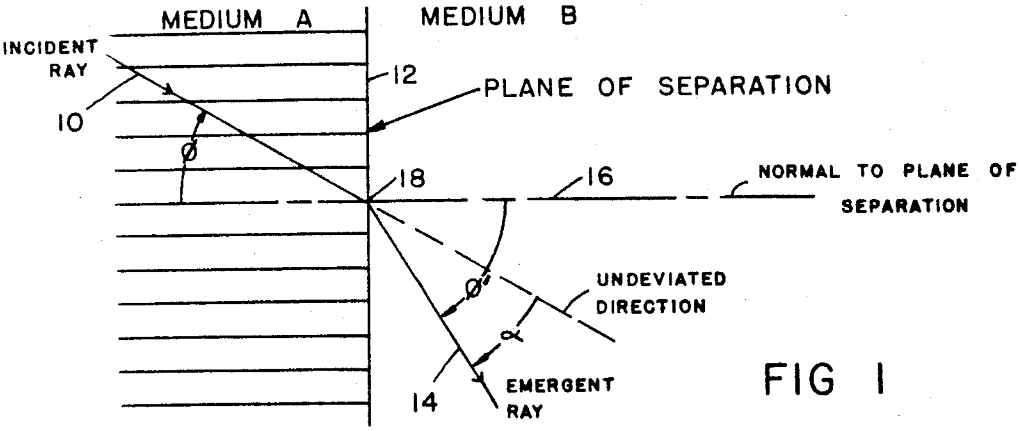
FIGURE 1 is a schematic view illustrating a principle of light refraction essential to a consideration of the invention.
Figure 2:
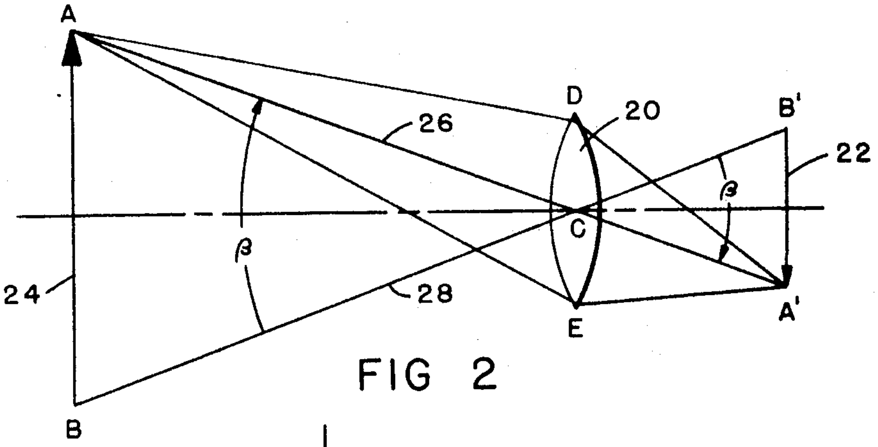
FIGURE 2 is a schematic view illustrating a principle of image formation in photographic optics as applied to a simple box camera.
Figure 3:
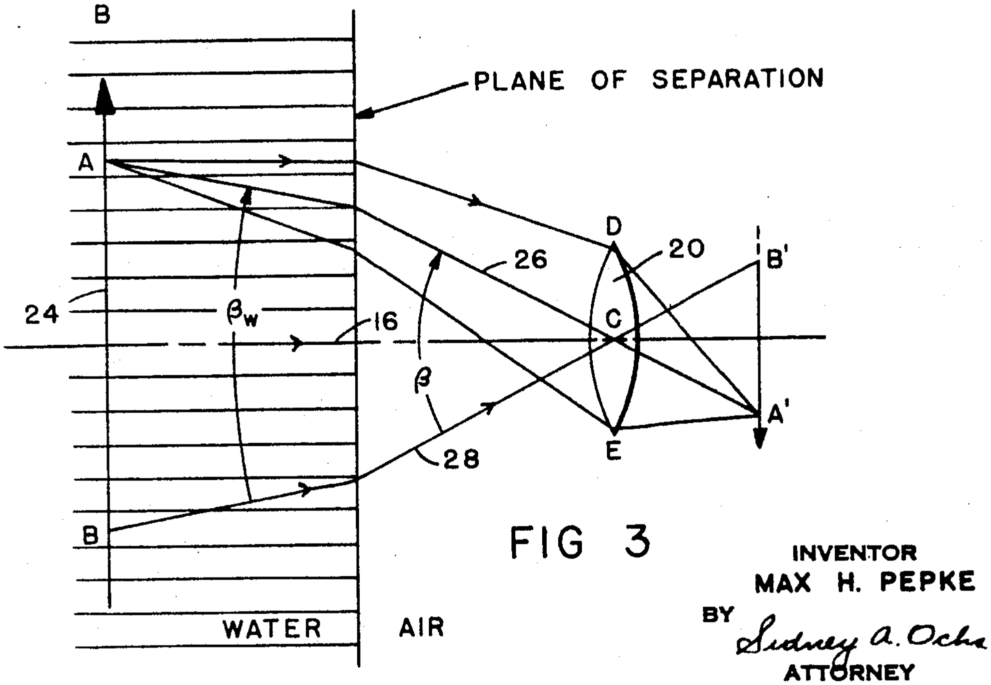
FIGURE 3 is a schematic view showing the field of view of a camera lens in underwater photography where a conventional flat window is used on the enclosure.

Referring first to FIGURES 1 to 3 for a few principles of light refraction applicable to the present invention a light ray 10, passing from a medium A, for example water, to an optically less dense medium B, for example air, is refracted from its undeviated direction toward the plane of separation 12 of the media. The angle $\phi'$ between the emergent ray 14 and the normal 16 (perpendicular) to the plane of separation 12, at the point of penetration 18 is greater than the angle $\phi$ between the incident ray 10 and the same normal 16. Since the angle of incidence $\phi$ and the angle of refraction $\phi'$ are related by Shell's law it follows that $$\frac{\sin \phi}{\sin \phi'}=\frac{n_b}{n_a}$$

where $n_b/n_a$ is the ratio of refractive indices of medium B with respect to medium A. Rearranging terms:

$$\sin \phi'=\frac{n_a}{n_b}\cdot \sin \phi$$

or $$\phi'=\text{arc} \sin \frac{n_a}{n_b}\cdot \sin \phi$$

This equation permits three observations to be made.

(a) With a given angle of incidence $\phi$, the angle of refraction $\phi'$ depends on the ratio $n_a/n_b$. Refraction is therefore greater with increasing differences between the refractive indices of the media.

(b) With given refractive indices, the angle of refraction increses as the angle of incidence is increased.

(c) In the special case of a ray 10 penetrating the plane of separation along the normal 16, $\sin \phi=0$, making $\phi'=0$. Hence a ray that passes from one medium to another normal to the boundary at the point of penetration is not refracted.

The increases of the angle of refraction listed in paragraphs (a) and (b) are of a non-linear nature because of the sine functions. For this reason the angle $\alpha$ between the undeviated direction of the ray and the actual refracted direction is not constant for all angles of incidence. However, as indicated the amount the ray 10 is refracted increases with increasing angles of incidence.

The foregoing principles of refraction apply to lens systems. Elements of optical glass in a lens system utilize refraction to deflect light rays in a manner which results in the formation of an image. This is demonstrated in FIGURE 2 in a simple box camera in which a convex or meniscus lens 20 forms an inverted image 22 of the object 24 at the film plane. In this action light rays from a point on the object 24 are brought to convergence by the lens 20, to form a corresponding image point. Since the object contains an infinite number of points each of which establishes a corresponding image point the image is continuous. Considering the rays from each object point one ray thereof passes through the optical or geometric center of the lens, the point through which rays pass without ultimate refraction disregarding a small amount of sideways displacement. This one ray is a chief ray, two of which are shown in FIGURE 2 as lines ACA' and BCB' at the extermities of the object 24. In a pinhole camera, the image is constructed entirely of the chief rays; image size for a given angle $\beta$ is determined by the distance between the pinhole and the film, and focus is entirely independent of this distance. In a lens system as in FIGURE 2, focus is not so arbitrary; the image 22 is formed in a specific plane by the action of chief rays incident upon the lens 20, assuming it to be perfect and the film must be placed in this plane for proper focus. The establishment of the focal plane is shown by the ray paths in FIGURE 2. Thus each object point radiates light rays, a small cone of which enters the lens as shown delineated by lines AD and AE in the object space. The chief ray 26 designated by the line ACA' which is central to the cone DAE of rays passes through the optical center C of the lens without being deflected into the image space behind the lens. All other rays in the cone such as rays AD and AE are refracted by the lens 20 so that they converge at some point along the chief ray 26 in the image space such as the point A' on the chief ray at which the refracted rays DA' and EA' converge. Past the point of convergence A' the rays DA' and EA' diverge. If the film is placed at the point of convergence the rays are stopped and an image point is formed. In the same way, an image point is formed for every object point.

Two factors influence the location of the image point A' along the chief ray 26. One is the refracting power of the lens and the other is the magnitude of the angle DAE, which is inversely proportional to the lens to object distance and directly proportional to the lens diameter. A lens with relatively high refracting power bends the rays considerably, thus bringing them to convergence at a point close to the lens. Low power lenses affect the rays less, so they converge farther behind the lens. Moreover, since the refracting power of a lens is determined by the magnitude of its focal length, defined as the distance between the lens and the point at which parallel rays entering the lens are brought to convergence, a lens with a short focal length has high refracting power, while long focal length lenses have low power. The effect then of high power on the location of the image point A' is to bring it nearer the lens and produce a smaller image. The effect of magnitude of the angle DAE is such that with a lens of constant power small angles DAE as occur with distant objects are brought to convergence closer to the lens than large angles. This is the reason a camera is focused at infinity by placing the film plane at the focal length of the lens (the point of convergence for parallel rays). Closer objects are focussed on by increasing the lens to film distance in order to reach the new point of convergence. As the lens-to-object distance is decreased increasing the angle DAE which in turn increases the distance CA', the effect of small changes in angle DAE on image position becomes greater and greater. For example when photographing very close objects, a small change in object position shifts image position by a great amount. Thus a shift of one inch in the object position may require a shift of one foot of the film plane for proper focus. For distant objects there is little difference between the image position of an object at 50 feet and the image position of an object at 100 miles.

These considerations are interrelated to the concepts of depth of field and depth of focus. Depth of field is the distance toward or away from the camera through which an object may be shifted before image blurring becomes objectionable, assuming a fixed lens to film distance. Depth of field varies with object distance and is greatest for distant objects. On the other hand depth of focus is the distance through which the film plane may be shifted toward or away from the lens before image blurring becomes objectionable, assuming a given fixed object distance. Depth, of focus unlike depth of field, decreases for distant objects.

The amount of blurring which can be tolerated depends upon film size and the amount the picture is to be enlarged before viewing at a given distance. The quantity which expresses blurring limits is the circle of confusion at the film plane. Geometrically it is the conic section taken by the film plane cutting the cone of convergent rays in the image space. The size of the circle or ellipse is determined by the distance of the film plane from the apex of the cone of rays from the object point A.

It has been pointed out that depth of field increases as the length of line CA′ is decreased as with distant objects. Length of line CA′ is also decreased with short focal length lenses. For comparable object distances, short focal length lenses have greater depth of field than long focal length lenses. Using the angles in FIGURE 2 the relationship may be stated as $$\text{Depth of field} \sim = \frac{\beta}{DAE}$$

from which it is seen that the angle DAE is zero in a pinhole camera, so the depth of field is infinite. Similarly depth of field is substantial for lenses which accept large angles B. The greatest angle B that a lens will accept is limited by the refracting power of the lens and the degree of correction built into the lens to compensate for aberrations. The latter tends to increase at the extremities of the image. For a lens of given design the maximum permissible angle B is limited to the point at which aberrations become objectionable. When the lens is used in a camera, the maximum angle is limited by the size of the film used to record the image. The film size is kept small enough so that it is within the acceptable angle of the lens. In a camera with a specific film size, the maximum angle of main rays which will record on the film is termed the acceptance angle, or the field of view of the lens.

With the foregoing fundamental preobservations in mind, reference is made to FIGURE 3 illustrating what happens where a flat window or port is employed for underwater observation or photography. Here the rays 26 and 28 from object 24 in the water medium are chief rays at the extremes of the field of view of the camera lens 20 and 16 is the chief ray on the axis of the camera. The latter ray 16 penetrates the boundary normal to the plane of separation and therefore suffers no refraction. Rays just off the axis are incident at small angles to the normals at penetration, and are therefore refracted slightly. However as the maximum acceptance angle is approached, rays are refracted more and more, reaching a limit at the field of view limits of the camera. Because the rays are refracted toward convergence, the full field of view of the camera is never realized in water. The image appears magnified and closer to the camera. Moreover, the magnification is not constant over the entire field; the non-linear increase of refraction away from the camera axis throws the edges and corners of the image out of focus and introduces considerable distortion. They appear to be stretched by pincushion distortion. Thus not only is the field of view of the camera reduced, but aberrations and severe defocussing are introduced.

In the description of FIGURE 2 above it was noted that the chief rays from object points pass through a single point—the optical center of the lens. These chief rays upon entering the lens appear to be travelling along the radii of an hypothetical sphere, the center of which is located at the optical center of the lens. It is this discovery which when taken in conjunction with a principle of refraction and a theorem of solid geometry forms the basis of a key aspect of the present invention. The principle of refraction states that a light ray passing from one optical medium to another is not refracted if it penetrates the boundary normal to the plane of separation at the point of penetration. This principle is wholly independent of the refractive indices of the media. The theorem states that given a plane tangent to the surface of a sphere and a radius of the sphere drawn to the point of tangency, the radius is perpendicular to the tangent plane. Stated otherwise every radius of a sphere penetrates the sphere normal to the surface at the immediate point of penetration.

Figure 4:
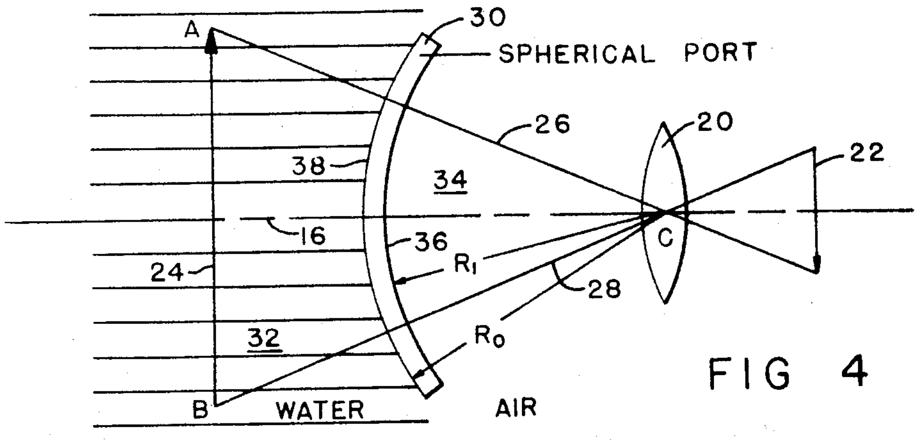
FIGURE 4 is a schematic view illustrating the present invention in its employment of a spherical port between the transmitting media and showing the optimum field of view and image formation possible thereby in a typical arrangement where the camera utilizes a simple convex lens. This figures also shows the relationship between port and lens in such an arrangement.

FIGURE 4, broadly illustrates the basic invention; the use of a spherical port 30 to seperate the transmitting media 32, 34, here designated as water and air respectively. The centers of curvature of the inner and outer spherical surfaces 36, 38 respectively of the port 30 are coincident and located at the optical center C of the lens 20. With this arrangement it will be apparent that all chief rays such as 16, 26 and 28 from the object 24 travel along radii of the spherical surfaces 36, 38 which separate the media, 32, 34. Also that all chief rays penetrate the boundary perpendicularly. Hence they are not refracted. Since no refraction occurs this system is independent of the refractive indices of the transmitting media 32, 34. Morover, with the centers of curvature of both surfaces 36, 38 of the spherical port 30 coincident, the port material may be any thickness and may be of any refractive index without causing refraction. Furthermore, the field of view of the camera as embodied in the lens 20 and image plane 22 suffers no reduction. It is the same in water as in air. In addition the problem of defocussing and aberration at the picture-edges and corners is completely eliminated.

In applying the invention to practical application the use of multi-element lenses may appear to present a problem from the standpoint of locating the point at which the center of the spherical window is to be located. Also the fact that not all light rays which contribute to image formation and location pass through the center of the lens (rays AD and AE in FIGURE 2 delineate the limits of the non-central rays).

Figure 5:
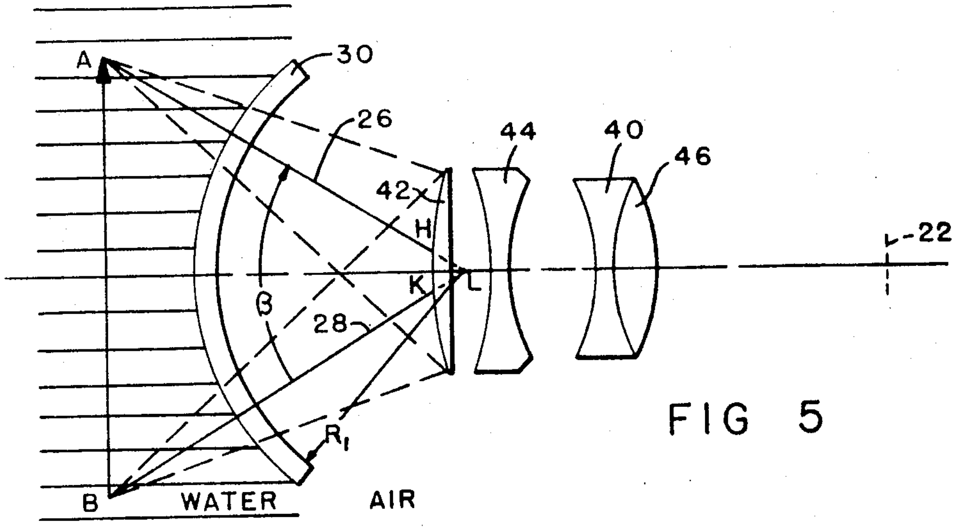
FIGURE 5 is a view similar to that of FIGURE 4 showing the relationship between port and camera lens for obtaining optimum benefits of the invention where the camera lens is a multi-element lens structure.

FIGURE 5 illustrates the manner of resolving the first condition. Here the chief rays 26, 28 from object points A and B to the lens system 40 do not follow straight line paths. They are deflected by the several lens elements 42, 44, 46, and pass to the focal plane 22. It will be noted that if these rays 26, 28 as denoted by the AH and BK are extended they will be shown by the dash lines HL and KL intersect at point L. Lines AHL and BKL are therefore radii of an hypothetical sphere, the center of which is located at point L. If therefore the spherical port 30 is placed with its centers at point L, the arrangement conforms to the principle developed in the description of FIGURE 4.

Figure 6:
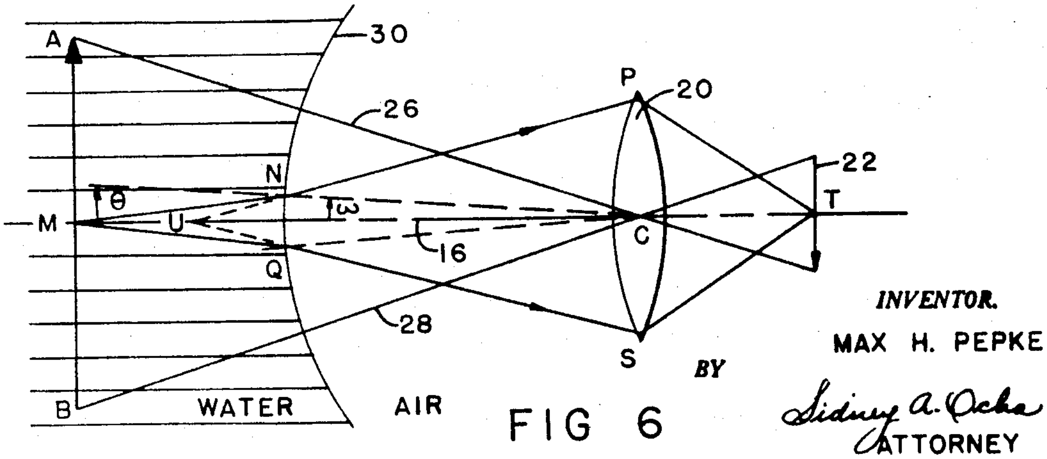
FIGURE 6 is a schematic view showing the path of non-central or incident rays of a cone of rays from a central object point and the effects of refraction by a spherical boundary thereon.

With regard to those rays which do not pass through the optical center of the lens it was shown in discussing FIGURE 2 and the establishment of the focal plane of a lens system and the factors influencing the location of the image points along the chief rays that the position of every image point is located by the intersection of the cone of rays from the corresponding object points. The point of intersection as seen in FIGURE 2 occurs along the chief ray at a distance determined by the magnitude of the angle DAE and the refracting power of the lens. FIGURE 6 further develops these factors. This figure shows three rays MN, MQ and MC from object point M immersed in water, passing through the spherical boundary or port 30 to the lens 20. As in FIGURE 4 the radius of curvature of the boundary is located at the optical center C of the lens 20. For simplicity of illustration the window or port 30 is here shown of zero thickness whereby the ultimate refraction suffered by a ray passing from water to glass to air is virtually the same as when passing directly from water to air. The chief ray 16 from object point M as represented by line MC travels along a radius of the sphere 30, so it is not refracted. All other rays from the object point M, however, penetrate the boundary at an angle to the normals to the boundary 30. For example, the rays MN and MQ penetrate the boundary 30 at an angle to the normals CN and CQ. These other rays are refracted by an amount which depends upon the refractive indices of the media and the angle with the normal. The extreme rays MN and MQ of the cone NMQ are refracted the most. The angle $\theta$ that ray MN makes with the normal to the surface 30 at the point N is the angle between the ray and the radius CN which is a radius of the sphere provided by the surface 30. The angle $\theta$ is also the sum of angle $\omega$ between the chief ray MC and the radius, and the angle NMC between the chief ray MC and the incident ray MN. Because the rays MN and MQ are refracted in a divergent direction the angle NMQ is less than it would be if the object were not immersed. In addition rays NP and QS enter the lens 20 at a slightly greater angle than for an object point in air at the same distance. The camera lens which locates the image point in terms of this angle, receives rays which seem to originate at the point U, the intersection of the extended incident rays. The resulting image point T along the chief ray 16 is therefore formed at a point which corresponds to a closer object point, i.e. the image point T occurs at a greater distance behind the lens than if the object point M were in air.

It was pointed out above that the magnitude of the included angle of rays entering a lens from a single object point is inversely proportional to the lens to object distance and directly proportional to the lens diameter. The effects of refraction by a spherical boundary, as seen in FIGURE 6, are therefore most noticeable with close objects and large diameter lenses, because the angle to the normal at penetration is greater. Another factor affecting the refraction of the incident rays is the radius of curvature of the spherical boundary. A spherical window with a large radius of curvature therefore introduces a smaller angle $\omega$ than a port with a small radius and therefore shifts the image less.

By employing a port 30 with a large radius and by selecting an appropriate lens, a high quality system may be evolved. As to lens selection it was noted in discussing FIGURE 2 that wide angle lens are relatively insensitive to slight changes of incident ray angles from a single object point i.e. the depth of field is great thus making it possible for a wide angle lens to have a diameter smaller than normal or telephoto lens of the same aperture or $f$ stop rating. By way of example, a typical wide angle lens designed for 16 mm. motion picture photography, with a focal length of 15 mm., an aperture of $f/2.5$ and a 6 inch minimum focussing distance, has a front element only ⅜ inch in diameter. Focussed in air at 6.0 inches, the angle DAE (FIGURE 2) is only 2.0 degrees, while the horizontal angle of view ACB is 34 degrees. When this lens is used with a spherical port 30 of approximately 2½ inch radius, the amount of focus shift is found to be negligible.

The effect of the spherical port on image size is also negligible when certain guide posts are followed. As already pointed out image size is determined by two factors (a) the magnitude of the included angle $\beta$ (FIGURE 2) and (b) the position of the image 22 along the chief rays from the extremities of the object. Of these two factors, the most influential is the magnitude of the angle $\beta$, particularly in the case of wide angle lenses. As long as the angle $\beta$ is kept unimpaired by the use of a spherical port, even a considerable shift in image position, as already described above in connection with FIGURE 6, causes only a small change in image size. With a large radius port and a wide angle lens, image size changes are negligible between objects in air and objects in water.

If it becomes necessary to use a lens and a port in which focus shift becomes a problem, corrections may be effected by locating the center of the spherical port on either side of the intersection point of the incident rays (point L in FIGURE 5) to make the system effectively magnifying or reducing and/or by grinding the front and rear surfaces of the port such that their radii do not coincide to effect a magnifying or reducing system or additional elements may be interposed to effect the desired correction.

Figure 7:
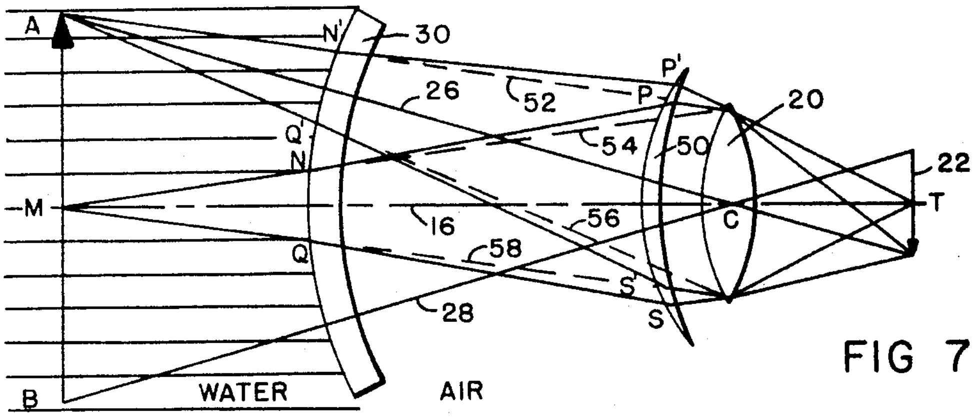
FIGURE 7 shows a possible method of correction for focus shift where a lens and spherical port combination make it desirable and which comprises interposing an additional element, for instance a meniscus lens as in this figure, between the spherical port and lens to converge the incident rays sufficiently to offset the amount of divergence caused by the spherical port.

The last named method is illustrated in FIGURE 7. Here a meniscus lens 50 is interposed between the spherical port 30 and the lens 20 to correct for focus shift produced by refraction of the incidental rays of the bundles of rays from the object points A, M and B. The dash lines 52, 54, 56 and 58 indicate the incident ray paths from points A and M for example, had there been no refraction. As seen the additional lens converges the incident rays MNP, AN'P', MQS and AQ'S' for example to offset the amount of divergence caused by the spherical port. It will be understood that for other purposes a convex or concave type lens may be used.

Although methods of correction have been described above it will be understood that these are given for the perfectionist and where a serious problem of focus shift is encountered. In actual practice, wide angle lenses are found most desirable for underwater work and when these are employed with a spherical port corrections are generally unnecessary.

Figure 8:
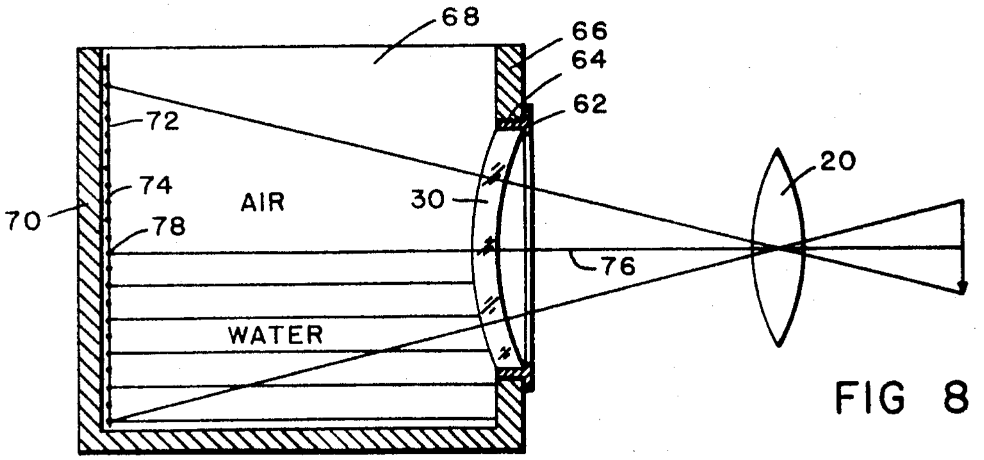
FIGURE 8 shows a test set up for verifying the principles of the invention and which involves observing by a camera or a magnifying through the lens viewer a ruled grid through a spherical port, of a box containing fluid half submerging both grid and port, the grid being fastened to the wall of the box opposite the port.

FIGURE 8, shows a test set up that was used to test the principles of the invention using the combination of the example given above of a spherical port 30 with a 2½ inch radius and a 16 mm. movie camera having a 15 mm. focal length lens 20. As shown the port 30 is mounted in a holder 62 over a hole 64 in the front wall 66 of a water tight box 68. The rear wall 70 of the box has fastened to it a ruled grid generally designated by the numeral 72 having equally spaced vertical and horizontal lines 74 thereon. The box was filled with sufficient water so that both grid and port were half submerged, the plane of separation of air and water coinciding with the axis 76 of the port and lens and with the horizontal line 78 of the grid 72. The movie camera lens 20 was positioned in front of the box such that the center of curvature of the port was coincident with the intersection of incident chief rays impinging upon the lens 20. With this arrangement the image on the film plane was divided into two distinct halves, as viewed through a magnifying through-the-lens viewer. The upper half of the image showed the grid as it appeared above water, and the lower half showed the grid below water. The two halves of the picture were divided by a fuzzy line which was due to the meniscus of the water in contact with the outer surface of the port. The lens 20 was set wide open at $f/2.5$ for focussing. With a wide-open lens and a very close object (10 inches in the test) the depth of field is very small, about one inch, and focussing becomes critical. The method was to focus critically on the grid above water, note the distance calibration of the lens, and then with no other changes, repeat for the submerged portion of the grid. Under the extreme conditions of the test the lens focussed critically at 10 inches above water, and at 9 inches below water. These distances fall between the depth of field limits for the lens set wide-open. Since depth of field increases for smaller apertures, and light conditions in the field usually require $f/5.6$ or smaller, the small amount of focus shift is negligible. The test also served to varify the theory that the field of view of the system was the same in water as in air. The half-submerged portion of the grid was found to be exactly the same size under water as it was above, when viewed through the camera.

This test demonstrates conclusively that the structure of the invention is suitable for immersion in any medium and may be used to photograph or view all parts of a partially submerged object simultaneously without distortion or shift.

Figure 9:
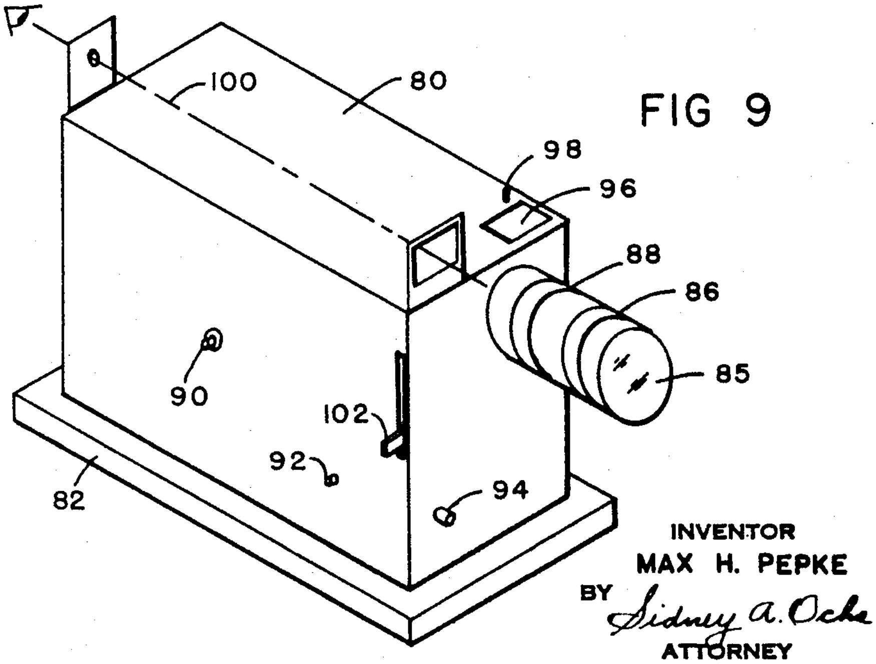
FIGURE 9 shows a typical movie camera for underwater photography secured to a base for adjustably mounting the camera in a housing or enclosure embodying the invention.
Figure 10:
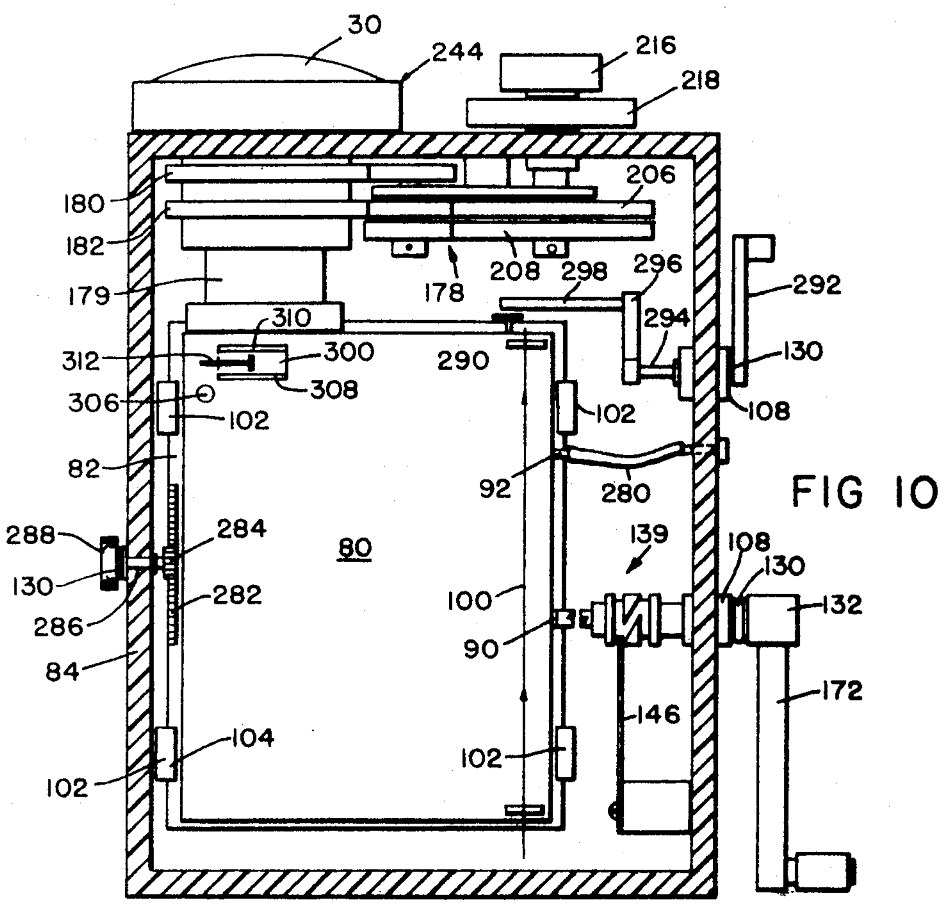
FIGURE 10 is a view of the camera housing with its top removed and showing the prototype camera of FIGURE 9, mounted therein and externally operable controls on the housing in connection with and adapted for coupling with the camera controls and showing the fixed port with its spherical lens in front of and coaxial with the camera lens and supporting body thereof.

Referring now to FIGURES 9 to 19 featuring the invention as applied to an underwater camera structure FIGURE 9 shows a typical movie camera generally designated by the numeral 80 suitably secured to a base plate 82 for adjustable mounting in a housing 84 such as shown in FIGURE 10. Such a camera 80 is conventionally provided with a lens 85, an iris setting knob or dial 86, a focus knob or ring 88, a spring motor wind 90, an external drive shaft 92, a run-stop pushbutton 94, a through-the-lens viewing means 96, a viewing actuator 98, a viewfinder arrangement generally designated by the numeral 100 and a shutter opening adjustment 102.

FIGURE 10 shows the camera 80 in the housing 84 the latter being a watertight box, which may be made of any suitable material for example, an acrylic synthetic plastic material and provided as hereinafter described with external controls for manipulating camera control functions while submerged. The box will be strong enough to withstand hydrostatic pressure while submerged. The box may be pressurized to help withstand outside pressure and to ensure that no water leaks into the housing. Demand pressurizing according to depth may be controlled by a flexible diaphragm (not shown) one side of which is exposed to the pressure inside the housing and the other side of which is exposed to the pressure of the sea water or other fluid outside the housing. When the outside pressure exceeds that inside the housing, the diaphragm is displaced and an air valve (not shown) is actuated allowing compressed air to enter the housing. The pressure of the compressed air source is made higher than the pressure of the greatest depth encountered. When the valve has bled enough pressure into the housing, the sensing diaphragm moves to its original position and the valve is allowed to close. The device may if desired be spring loaded to provide a slight positive pressure inside the housing over the ambient pressure.

The camera mounting plate 82 may be secured to the camera in any suitable manner as by a screw extending through the plate into the standard camera hold-down screw hole. The plate 82 is as best seen in FIGURE 10 made slightly larger than the camera body and is arranged to slide drawer-like in guides 102 fastened to the bottom of the housing, four being provided for this purpose. The guides have overhanging top pieces 104 which effectively clamp the plate 82 in a predetermined position of the camera.

Figure 12:
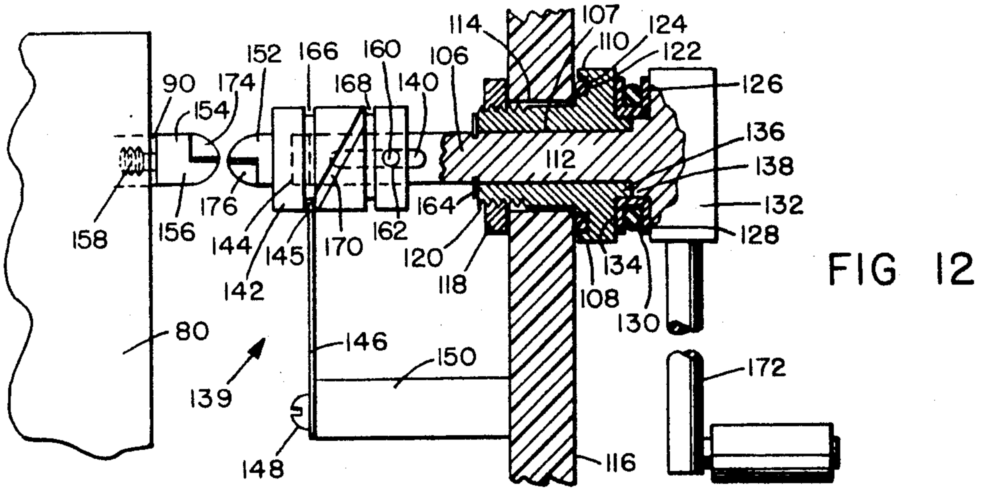
FIGURE 12 is a fragmentary plan view partly in section showing the camera spring motor wind coupling and disconnect of FIGURE 10 and illustrating a preferred form of shaft seal as applied to the crank shaft of this mechanism.

All shafts from the external controls enter the housing 84 through mechanical seals which prevent the entrance of water. The seals may provide rotary or linear motion. A typical shaft seal is shown in FIGURE 12 in connection with the spring motor wind control shaft. As there seen the wind shaft 106 is journalled in the bore 107 of a bushing 108 having a head portion 110 and a shank portion 112 extending through an opening 114 in the sidewall 116 of the housing to the interior of the housing. The bushing is tightly held to the well by a threaded nut or collar 118 received over a threaded portion 120 of the shank. The head portion 110 is undercut adjacent the wall 116 by an annular groove 122 in which an O-ring seal 124 of elastomeric material is received and clamped against the wall 116 by the head 110 of the bushing to provide a static seal. A rotary seal 126 provides a seal between the shaft and bushing and comprises a thin wall plastic spool 128 preferably of nylon or teflon carrying an elastic O-ring 130 which forces the spool faces against the knob or crank end 132 of the shaft and the entrance face 134 of the bushing. As seen the spool is half supported on a projecting shoulder or axial flange 136 of the bushing and a shoulder 138 on the shaft.

Referring further to FIGURE 12 this figure shows in enlarged scale a form of disconnect or coupling mechanism generally designated by the numeral 139 which it is necessary to provide internally of the housing in FIGURE 10, between the camera spring motor wind shaft 90 and the external crank 132 for disconnecting the same to avoid loading the spring motor by the seal 126 when shooting. The mechanism 139 comprises the drive shaft 106 of the crank 132 which shaft has an elongated axial slot 140, a drive spindle 142 having a blind axial bore 144 for receiving the inner end of the shaft 106, a flat spring 146 interengageable with the spindle 142 and suitably mounted to the housing wall 116 through a screw 148 and post 150, a drive tip 152 on the spindle 142 and an adapter 154 which screws into the camera wind shaft 90 after the conventional winding crank has been removed and which has a tip 156 interengageable with the drive tip 152 of the spindle. The adapter is coaxial with the shaft 106 and spindle 142. Assuming that the camera winds with a counter clockwise rotation the adapter will have a left hand thread 158 to prevent its unturning. The drive spindle axial bore 144 is a sliding fit over the shaft 106 and a pin 160 which is press fitted in receiving transverse holes 162 in the spindle walls passes freely through the slot 140 and a retaining split ring 164 locates the shaft 106 in the bearing bushing 108. Thus the shaft 106 is held axially fixed but may rotate and the spindle 142 may move axially of the shaft 106 but may not rotate relative to it, i.e. it rotates with the shaft 106. The drive spindle 142 has two parallel transverse surface grooves 166, 168 which are connected tangentially by a skewed groove 170. The spring 146 engages the grooves of the drive spindle.

The mechanism is shown in the disengaged position it would have while shooting. The spring 146 exerts a slight pressure on the inner face of the run groove 166 nearest the skewed groove 170. When the crank arm 172 is rotated counter clockwise, the skewed groove 170 in the drive spindle 142 engages the tip 145 of the spring 146 and moves the tip in the direction of this groove. The resulting tension in the spring 146 causes the spindle 142 to move toward the adapter 154 on the camera 80. The tips 152 and 156 respectively of the spindle and adapter have quadrants 174, 176 and quadrants diametrically opposite these cut away such that the remaining two quadrants of these tips may mesh in a driving relationship. When these tips are in position to mesh, the spring 146 moves the spindle 142 in for a full mesh and as the operator continues to crank counter clockwise the camera spring is wound and the spring tip 145 runs in groove 168. When the camera is fully wound, the operator stops winding counter clockwise and begins turning the crank clockwise. The clockwise engaging faces of the tips of the spindle and adapter are so shaped as by a slight taper such that relative clockwise rotation between them tends to force the spindle out of engagement. Continued clockwise cranking allows the spring tip 145 again to enter the skewed groove 170 and by reason of the stiffness of the spring 146 force the spindle clear of the adapter, the spring tip finally again running in the groove 166. At this point the camera is ready for shooting.

Figure 13:
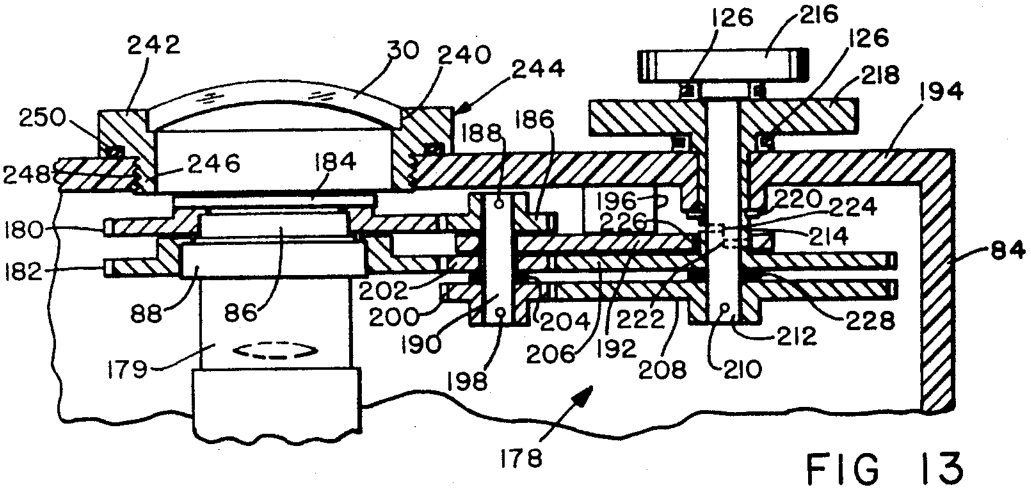
FIGURE 13 is a fragmentary plan view partly in section of the camera housing port and lens of FIGURE 10 and the external focus and iris adjustment controls of FIGURE 10 in relation to the camera lens body and iris and focus adjust elements thereof.
Figure 14:
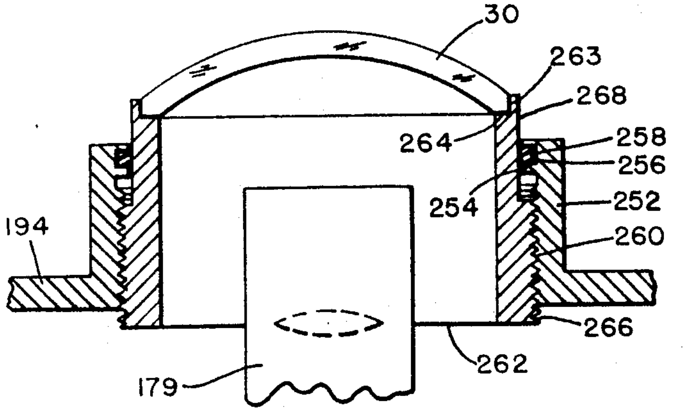
FIGURE 14 is an enlarged plan view partly in section of a modification of the housing window structure showing an arrangement to provide for changing the distance between the camera lens and window by adjustment of the latter.

Another feature of the invention is the mechanism for effecting the focus-iris adjustment from outside the housing. The iris setting knob 86 of the camera 80 is conventionally a knurled or fluted ring which rotates to set *f*/stop opening as shown on a calibrated dial and the focus knob 88 is a similar ring which rotates to set focus. The latter ring rotates relative to a calibrated distance scale which is engraved on the non-rotating part of the lens. FIGURE 13 shows on an enlarged scale a mechanism generally referred to by the numeral 178 in FIGURE 10 for accomplishing the adjustment of the lens when the lens system 179 employed with the port 30 is one where the iris setting knob 86 and *f*/stop scale both rotate when the focus knob is rotated but not with respect to each other such that the *f*/stop setting once made, does not change when the focus knob is rotated. In the figure the iris and focus adjust knobs 86 and 88 are fitted with two gears 180, 182 of the same size. The focus gear 182 slips over and is indexed to the focus adjust knob 88. This gear 182 is held in place by the iris adjust gear 180 which slips over, and is indexed to, the iris adjust knob 86. The iris adjust gear 180 is held in place by a clamping ring 184, similar to a filter holder, which screws into the standard internal threads provided in the lens 85 (FIG. 9) to receive filter holders.

The iris adjust gear 180 engages a front idler pinion 186 suitably fixed as by a pin 188 to a short shaft 190 rotatably supported in a bearing plate 192 rigidly connected to the front wall 194 of the housing 84 by a bracket 196. The shaft 190 also has fixed thereto by a pin 198 a rear idler iris pinion 200 of the same size as the pinion 186. A third idler pinion 202 also the same size as the pinion 186 freely rotates on the shaft 190 and engages the focus adjust gear 182. A suitable spacing collar 204 locates the focus adjust idler pinion 202 intermediate the plate 192 and pinion 200.

The focus and iris idler pinions 202 and 200 respectively, engage with a focus drive gear 206 and iris drive gear 208 respectively which gears are the same size as gears 180, 182 on the lens in order to have a 1:1 correspondence of rotation. The iris drive gear 208 is fixed by a pin 210 to a shaft 212 frictionally journalled in a sleeve 214, in turn rotatably journalled in the wall 194 of the housing 84. The shaft 212 is enlarged exteriorly of the housing to form the iris adjust knob 216. The sleeve 214 also is enlarged outside of the housing to form the focus adjust knob 218 which is larger in diameter than the iris adjust knob 216 and carries an $f$/stop scale on its end face adjacent the iris adjust knob 216. A distance scale is carried by the wall 194. Suitable rotary seals 126 are provided between the wall 194 and focus knob 218 and between the iris adjust knob 216 and focus adjust knob 218. The focus knob 218 and its integral sleeve 214 are located and held in the wall 194 by a spring ring 220. The sleeve 214 has a milled flat 224 on its inner end which engages a corresponding milled flat 222 on the hub 226 of the focus drive gear 206 located intermediate the iris drive gear 208 and the plate 192 and which drivingly engages the focus idler pinion 202. The gear 206 is freely journalled on the shaft 212 and its hub 226 extends through the plate 192 and may be journalled in it. A washer 228 spaces the gears 206, 208. It will be evident that the engaged flats 222, 224 form a drive coupling between the focus knob 218 and the gear 206 but allow some axial movement therebetween to enable tight springing of the seals 126 and to take up slack.

In operation iris settings are made by rotating the iris adjust knob 216 relative to a $f$/stop scale 217 (see FIG. 11) on the focus knob 218, such movement being transmitted through the gear 208, idler pinions 200, and 186 to the iris gear 180 carried by the lens mount or carrier 179. Focus settings are made relative to a distance scale 219 (FIG. 11) on the housing wall 194. When setting focus, both knobs 218 and 216 rotate together and all the gears in the system rotate together, hence the iris setting is retained.

It will be understood that the iris and focus adjustments could be made independent of each other in which case separate stationary scales would be provided for the knobs 216 and 218 and means such as a detent would be provided to prevent rotation of the iris knob 216 when rotating the focus knob 218.

As shown in FIGURE 13 it is ordinarily desirable to provide a structure with a fixed lens to window distance which has been predetermined for minimum distortion and refraction of incident light rays. In such cases the spherical window or port 30 is suitably cemented or otherwise secured in an annular recess 240 of the outer head portion 242 of a holder 244 having a threaded projecting portion 246 which engages in the threaded mating opening 248 in the housing wall 194. The head portion 242 seats against the wall 194 and is provided with an O-ring fluid seal 250 to make the joint fluid tight. Manifestly the port 30 mounting will also be fluid tight.

Should some relative axial adjustment be required between the camera lens and port 30 such may be accomplished by shifting the port 30 which among other things eliminates any complicated coupling. Such an arrangement is shown for example in FIGURE 14 and could replace that shown in FIGURE 13. As seen the forward wall 194 of the housing 84 is provided with an external boss 252 having a through bore somewhat reduced at the forward end so as to comprise annular land or internal flange portion 254 provided with an O-ring seal receiving recess 256 which receives a seal 258 and a larger internal threaded annular land 260 opening rearwardly into the housing. An adjustable lens mount or holder 262 has a forward annular recess 263 providing a shoulder portion 264 against which to seat and secure the lens port 30 in a fluid tight relationship. The holder 262 has an externally threaded barrel portion 266 mating with and adjustable in the annular threaded land 260 of the housing and has a smooth barrel portion 268 operable on the land 254. The O-ring 258 forms a fluid tight seal between the barrel 268 of the port holder and the land 254. It will be evident that the holder 262 is adjustable in and out of the boss 252 relative to the camera lens carrier 179 by merely rotating this holder 262 in the proper direction on the thread 260.

Should the camera be provided with a shaft 92 through which the camera mechanism is driven by an external motor instead of an internal spring motor and have a fluid tight flexible shaft connection 280 between the shaft 92 and the housing 84 to which the external connection may be made any adjustment between the lens of the camera and the port 30 may if desired be made through a rack and pinion connection 282, 284 with the camera mounting base 82 as seen in FIGURE 10. The pinion 284 will be carried by a control shaft 286 extending through the housing 84 and provided with an adjust knob 288 having a running seal connection 130 with the housing 84. When this type of adjustment is provided it is preferred that the iris and focus adjustment gears 180, 182 be provided with sufficiently wide faces to accommodate the same.

The camera housing may also be provided with selective extension tubes (not shown) for carrying the port lens 30 similar to those commonly used in photography to increase lens to film distance. Changing of the extension would have to be done out of water.

In order to control running of the spring motor (not shown) or external motor drive, the camera is provided with a run-stop pushbutton 290 located at the forward end of the camera in FIGURE 10. The camera runs when the pushbutton is depressed, stops when released. Suitable connections, mechanical or electrical as needed, are provided between this button and the motor. A crank lever 292 having a shaft 294 rotatably journalled in a running seal type of mount such as shown in FIGURE 12 carries a lever 296 having a laterally projecting finger 298 adapted to engage the button 290. If desired the lever 292 may be provided with suitable spring detents or catches (not shown) to hold the button in its depressed or out position or both.

Optical systems for reflex movie cameras vary considerably; some consist of a simple lens which magnifies an image on a ground glass screen, and others have complex optical trains which bring the eyepiece to the rear of the camera. All are similar in that the eye must be quite close to the viewer eyepiece to see the entire range. Such small eye relief makes it difficult to view the image while wearing glasses, and quite impossible while wearing a face mask under water. My invention provides an optical system designed for sufficient eye relief as required for underwater viewing. Such a system generally designated by the numeral 299 is shown for example in somewhat schematic form in FIGURE 15 as applied to the housing 84 and camera 80 of FIGURE 10. In the camera a simple lens 300 magnifies an image on a ground glass screen 302. A tippable reflex mirror 304 which reflects light from the taking lens is movable into position by depressing a spring returnable pushbutton 306 (FIG. 10) operably connected with the mirror shaft and located top side the camera as seen in FIGURE 10. This button 306 is operable in any suitable manner as by a plunger or lever (not shown) through a suitable liquid tight seal whenever reflex viewing is desired. Preferably a connection is provided between this mirror 304 and the run-stop mechanism operable by the button 290 (FIG. 10) such that the system is automatically disengaged when the run-stop pushbutton 290 is depressed for shooting and returns the mirror for reflex viewing when the camera is stopped.

Figure 15:
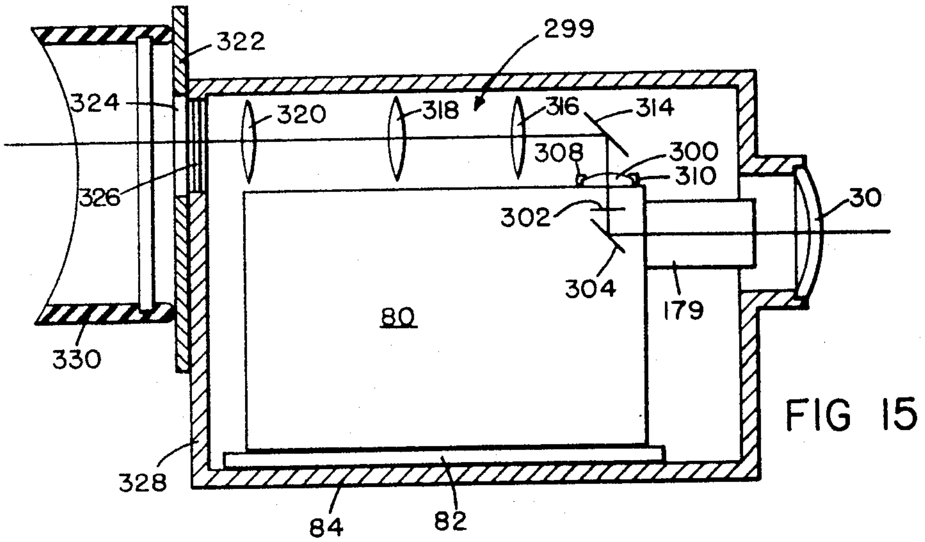
FIGURE 15 is an elevational view partly in section and in part schematic showing one form of through the lens viewer optical system for visually viewing the image seen by the camera in underwater work when the operator wears a face mask or glasses.

As seen in FIGURES 10 and 15 the simple lens 300 is mounted on fixed slides 308, 310 so that it may be slid to one side by suitable means such as a flexible but stiff wire 312 to uncover the ground glass screen 302. The wire is suitably anchored to the lens 300 and may extend through a fluid seal in the housing 84 to be externally operated by a button or the like (not shown). With the lens 300 out of the way, light rays from the ground glass 302 are reflected by a mirror 314 positioned above the screen and magnified by a suitable lens system shown in FIGURE 15 to comprise three convex lenses 316, 318, 320 which may be suitably mounted as in a tube not shown located on the camera or housing and which may also carry a support for the mirror 314. In order to keep bright outside light from interfering with viewing, an opaque plate 322 apertured at 324 is preferably provided and mounted to the housing 84 surrounding the viewing window or view port 326 in the rearward end wall 328 of the housing. By the diver pressing his face mask 330 against the opaque plate 322, the viewing area is darkened. it will be understood that if the housing is made of a clear plastic that the special window 326 and others of a similar character on the housing may be eliminated. In such a case the inner wall of the housing 84 should be masked in any suitable manner as by painting or a sheet overlay to the extent required.

Figure 11:
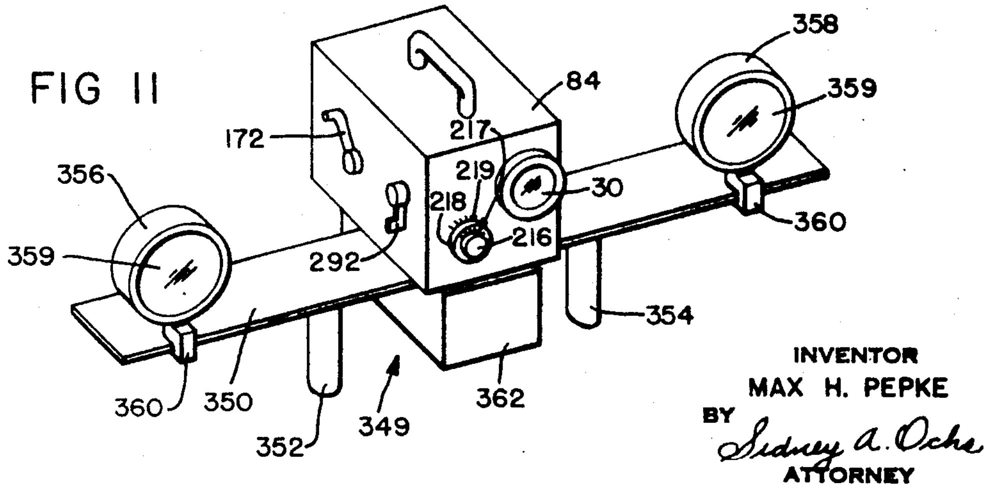
FIGURE 11 is a perspective view of one form of manual carrying structure for use with the camera and housing combination of FIGURE 10 embodying the invention and providing sources of light for the camera.

FIGURE 11 shows an underwater carrying means generally designated by the numeral 349 for my underwater camera of FIGURE 10 which is a further feature of my invention. As there shown the housing 84 is mounted on a flat member 350 which serves as a hydroplane to steady the camera when shooting while swimming. Two spaced handles 352, 354 secured to the underside of the plane provided suitable means for managing the outfit in swimming shots. This member 350 also provides an advantageous structure for providing adjustable light sources such as lamps 356, 358 on opposite sides of the camera for use in dark places. These lamps have their lenses 359 facing in the same direction as the port 30 and are preferably mounted on clamp brackets 360 operable such that the lamps may be movable along the member 350 to give the most effective lighting. A suitable container 362 may be provided on the member 350 under the camera to hold batteries (not shown) to power the lamps and/or motor means if such is provided internally of the camera. It will be understood that power for the lamps may also be generated at the surface and run to the lights with a suitable cable.

Because of considerable variation in lighting conditions under water, it is desirable to provide filter means when submerged and means for changing the same by adjustment externally of the housing 84 when located interiorly thereof. This is especially necessary for color photography where color correction filters are needed to compensate for color temperature shift due to absorption of the water. The filters may be a waterproof type, to be clipped or screwed on to the lens port 30, holder 242 (FIG. 13), 268 (FIG. 14) of the assembly 241 or means may be provided inside the housing 84.

Figures 16, 17, 18:
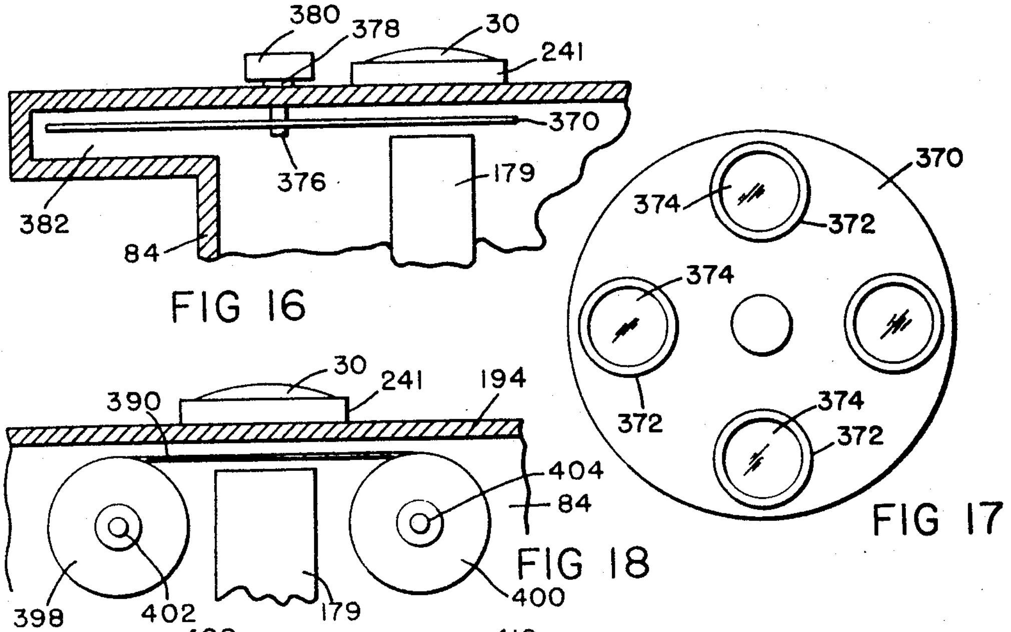
FIGURE 16 is a fragmentary plan view partly in section of a portion of the camera and housing illustrating an arrangement for providing color correction filters by a filter wheel and controlling the same externally of the housing when the unit is submerged.
FIGURE 17 is an elevational view of the filter wheel of FIGURE 16.
FIGURE 18 is a fragmentary plan view showing a modification of the filter system of FIGURE 16 wherein the filters are on a tape operable between a pair of drums.

Two arrangements for accomplishing the latter result are shown in FIGURES 16 to 19. As seen in FIGURES 16 and 17 a disc 370 similar to a lens turret having a plurality of openings 372 (four being shown) for different filters 374 is suitably mounted by a central shaft 376 for frictional rotation in a fluid tight bearing 378 provided with sealing means of the character shown in FIGURES 12 and 13. The shaft 376 has a knob 380 outside of the housing 84. Rotation of the knob permits changing of the filters. In this connection it will be noted that the disc 370 is so mounted that the apertures 372 move into axial alignment with the camera lens carrier 179 intermediate the lens port 30 and the camera lens upon rotation of the disc. In order to provide adequate space within the housing 84 laterally of the carrier 179 a lateral pocket 382 is preferably provided in the side of the housing 84.

Figure 19:
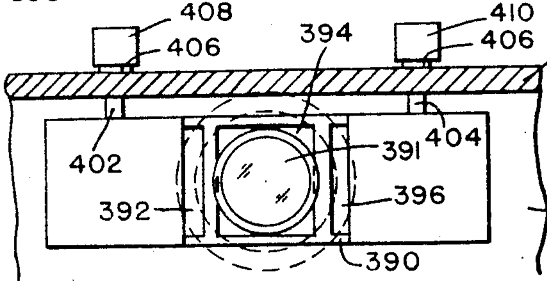
FIGURE 19 is an elevational view of the tape of FIGURE 18 and showing the external drum wind controls.

In FIGURES 18 and 19 the filter means comprises a flexible tape or strip 390 not unlike a strip of 35 mm. film arranged to pass intermediate the lens port 30 and the camera lens 391. The strip 390 comprises a plurality of different filter areas 392, 394, 396 for example wound on two spools 398, 400, the shafts 402, 404 of which pass through fluid tight seals 406 in bearings (not shown) but of the character shown in FIGURES 12 and 13 in the top wall 401 of the housing 84. The shafts 402, 404 have knobs 408, 410 outside the housing 84 by which the spools 398, 400 may be rotated to reel the strip 390 back and fourth across the port 30 to the desired position in front of the camera lens 391 to provide the desired filter medium. An indexing means (not shown) for example in the form of a Geneva mechanism or detent on one or both spools or shafts is preferably provided to keep track of the particular filter which is front of the camera lens and lock the same in position until a change in filters is needed.

Figure 20:
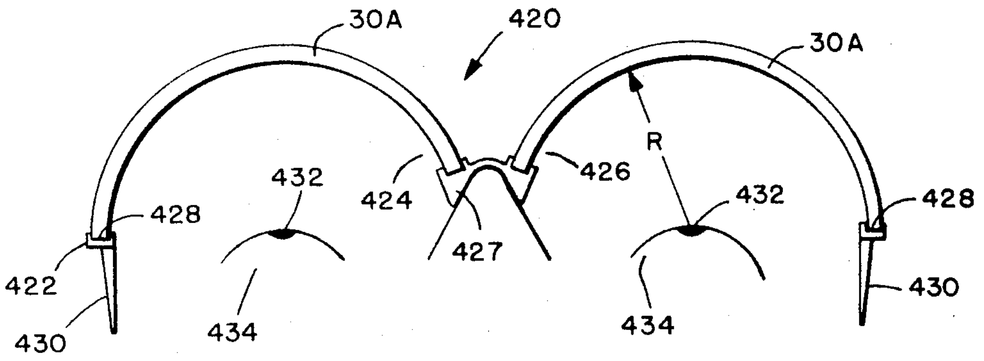
FIGURE 20 is a plan view, partly in section of a structure applicable to a face mask or diving goggles embodying the invention.

The spherical port principle of the invention described above may also be applied to diving masks or goggles. FIGURE 20 shows this principle applied for example to a pair of goggles generally designated by the numeral 420 and comprising a suitable substantially rigid frame 422 of metal or plastic having two frame lens openings 424, 426 connected by bridging means 427 and provided with lens receiving recesses 428 and having flexible goggle wearer conforming means 430 to fit the wearer. As seen there is suitably mounted and sealed in each lens opening recess 428 a spherical port or eye piece 30A of glass or plastic such as the port 30 described above. Thus a separate port is preferably provided for each eye. The center of sphericity of each port as designated by the radius R will be located at the pupil 432 of the eyes 434 when looking straight ahead and the elements 430 will be formed and located to fit the wearer to make this possible. The eye moves slightly away from the center of sphericity when looking to the sides or up or down, but if the radius of the spherical segment forming each port 30A is kept large with respect to the movement, the distortion will be negligible. It will be understood that the same structure may be applied to a mask.

The described goggle structure is particularly useful in those cases where the diver normally wears eye glasses. It is impossible to wear eye glasses with a face mask under water. Some schemes have been suggested by which prescription lenses are secured to the flat face plate inside of the mask. Since the mask is customarily of flexible rubber, the face plate and lenses tend to shift constantly from breathing (when the mask includes the nose) and from movements and variations in air pressure. Such shifting is disconcerting and can cause dizziness and nausea.

It has been described above in connection with the port 30 that it will magnify or reduce the size of the object in water when the center of sphericity of the port is located ahead or behind respectively the point of intersection of the incident rays. The port may therefore be effectively made a lens. Thus in the goggle structure described the ports 30A could be supplied to afford the proper correction for each eye and the need for glasses or prescription mounts under water would be eliminated.

The requisite amount of correction, ultimately determined by the direction and amount of difference between the center of sphericity of the port 30A and the pupil 432 of the eye may be achieved in practice by (1) selecting the requisite distance between the pupil of the eye and the port 30A and/or (2) utilizing a radius of curvature for the port 30A to provide the required correction. In only extreme cases would it be suggested that additional lenses be secured to the ports 30A.

By using goggles as described the effects of objectionable shifting incurred with conventional masks and goggles is reduced to a tolerable level or substantially completely eliminated.

Figure 21:
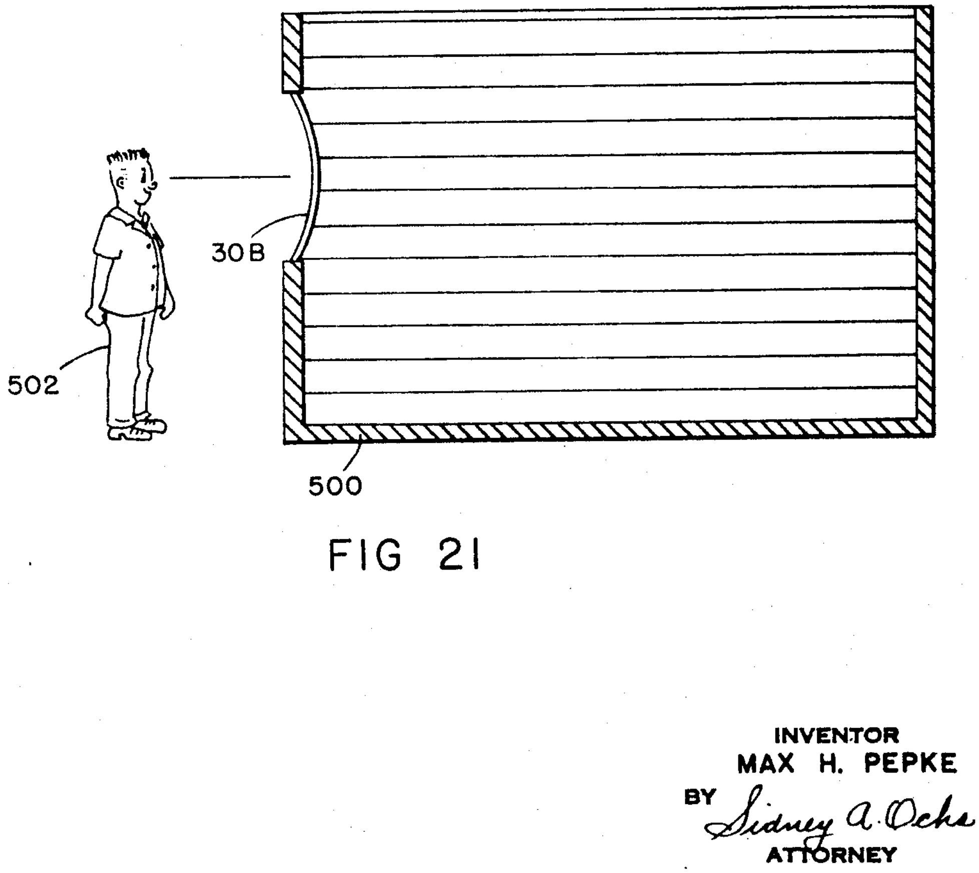
FIGURE 21 is an elevational view in section of a fluid containing tank provided with a large window or port embodying the invention through which an operator standing at a predetermined distance from the window may view objects in the tank.

There are also a number of situations where submerged objects are to be viewed to which the port 30 principle of the present invention may be applied. Such examples are viewports in bathyspheres, driving bells or various kinds of tanks. FIGURE 21 illustrates such an application. As there shown a tank 500 which may be an aquarium, storage or processing tank, or swimming pool is fitted with a large spherical port 30B similar to the port 30 described above through which an observer 502 outside the tank may view objects in the fluid contained in the tank.

The same kind of structure may also be used for observing manipulations of radioactive materials which are conventionally handled under water. The operations could be observed directly by the operator standing with eyes close to the center of sphericity of the port (the port is made large to minimize inaccuracies of location due to interpupillary distances) or by a lens system correctly placed. If photographs or television pickup are desired, a camera could be located on a tripod or other camera mount.

When used as a port in a bathysphere, the port 30B may be made of any transparent material and sufficiently thick to withstand pressures without losing its optical qualities. It will be recalled in connection with this port structure that as stated above in relation to the port 30 the system provided by the port 30B is independent of the refractive indices of the transmitting media because no refraction occurs. Also with the centers of curvature of both surfaces of the spherical port 30B coincident, the port material may be of any thickness and may have any refractive index without causing refraction.

From the above description of the invention it will be apparent that a new and novel approach to underwater photography has been made and a practical structure providing all the benefits thereof in several different forms has been presented. It will be understood that various changes and modifications may be made in the described embodiments without departing from the spirit and intent of the invention. Accordingly all such changes and modifications as may come within the purview of the appended claims and all equivalents are contemplated.

I claim:

1. An optical system for substantially distortionless photographing of objects in a first medium through boundary means between said first medium and a second medium of the same or different index of refraction, said optical system comprising said boundary means and camera lens means in said secondary medium through which to photograph said objects, said boundary means consisting of a meniscus lens having substantially concentric spherical surfaces, each convex to the objects and having their center of curvature at the center of the entrance pupil of said camera lens means.

2. An optical structure for substantially distortionless photographing of objects in a first medium through boundary means between said first medium and a second medium of the same or different index of refraction containing photographing means comprising a lens system, said structure comprising a closed casing containing said lens system and said second medium, and a port in a wall of said casing constituting said boundary means, said port consisting of a meniscus lens having substantially concentric spherical surfaces each convex the objects and having their center of curvature at the center of the entrance pupil of said lens system.

3. An optical structure as claimed in claim 2 wherein said lens system comprises a bi-convex lens.

4. An optical structure as claimed in claim 2 wherein said lens system comprises a plurality of lenses.

5. An optical structure for substantially distortionless photographing of objects at least in part in a liquid medium, through a port between said liquid medium and another medium of different index of refraction from said liquid medium containing camera means having a lens system through which to photograph said objects as seen through said port, said structure comprising a closed casing mounting said port and containing said camera means and said second medium, said port being coaxial with said lens system, said port consisting of a meniscus lens having substantially concentric sperical surfaces each convex to the objects and having their center of curvature at the center of the entrance pupil of said lens system, and means for positioning said port lens and camera lens system relative to each other to locate said center of curvature at the center of the entrance pupil of said lens system.

References Cited by the Examiner

UNITED STATES PATENTS

| | | | |
|---|---|---|---|
| 2,001,683 | 5/1935 | Jackman | 88—1 |
| 2,008,530 | 7/1935 | Wick | 88—54 |
| 2,730,014 | 1/1956 | Ivanoff et al. | 88—57 |
| 2,855,826 | 10/1958 | Jayet | 88—113 |
| 2,906,187 | 9/1959 | Dotson | 95—64 |
| 2,909,109 | 10/1959 | Back | 95—42 |
| 2,944,474 | 7/1960 | Dennis | 95—11 |

FOREIGN PATENTS

| | | |
|---|---|---|
| 1,040,064 | 5/1959 | France. |
| 1,167,779 | 8/1958 | France. |

JEWELL H. PEDERSEN, *Primary Examiner.*

J. M. HORAN, JOHN K. CORBIN, *Examiners.*

R. J. STERN, *Assistant Examiner.*